United States Patent [19]

Matsumoto et al.

[11] Patent Number: 5,587,909
[45] Date of Patent: Dec. 24, 1996

[54] MISFIRE DETECTING METHOD

[75] Inventors: Takuya Matsumoto; Toru Hashimoto; Koichi Namiki; Yasuhisa Yoshida; Satoshi Kasai, all of Tokyo, Japan

[73] Assignee: Mitsubishi Jidosha Kogyo Kabushiki Kaisha, Tokyo, Japan

[21] Appl. No.: 150,063

[22] PCT Filed: Jun. 8, 1993

[86] PCT No.: PCT/JP93/00764
§ 371 Date: Nov. 18, 1993
§ 102(e) Date: Jan. 18, 1994

[87] PCT Pub. No.: WO93/25809
PCT Pub. Date: Dec. 23, 1993

[30] Foreign Application Priority Data

Jun. 16, 1992 [JP] Japan .................................... 4-156976
Feb. 17, 1993 [JP] Japan .................................... 5-028216

[51] Int. Cl.$^6$ ................................................. G01M 15/00
[52] U.S. Cl. ................................................. 364/431.08
[58] Field of Search .................. 364/424.01, 431.01, 364/431.03, 431.07, 431.08, 431.09; 123/192.1, 192.2; 73/117.3, 116

[56] References Cited

U.S. PATENT DOCUMENTS

| | | | |
|---|---|---|---|
| 4,351,281 | 9/1982 | Geiger et al. | 123/425 |
| 4,366,541 | 12/1982 | Mouri et al. | 364/431.05 |
| 4,428,343 | 1/1984 | Schweikert et al. | 123/425 |
| 4,509,484 | 4/1985 | Gertiser | 123/436 |
| 4,807,581 | 2/1989 | Nishikawa et al. | 123/488 |
| 5,033,425 | 7/1991 | Kadomukai et al. | 123/192 R |
| 5,041,980 | 8/1991 | Maddock et al. | 364/431.03 |
| 5,056,360 | 10/1991 | Dosdall et al. | 73/116 |
| 5,095,742 | 3/1992 | James et al. | 73/116 |
| 5,109,695 | 5/1992 | James et al. | 73/117.3 |
| 5,186,136 | 2/1993 | Kadomukai et al. | 123/192.1 |
| 5,237,504 | 8/1993 | Holmes et al. | 364/431.08 |
| 5,263,453 | 11/1993 | Wakahara et al. | 123/436 |
| 5,307,670 | 5/1994 | Imai et al. | 73/117.3 |
| 5,357,790 | 10/1994 | Hosoya | 73/117.3 |
| 5,359,518 | 10/1994 | Wimmer | 364/431.03 |

FOREIGN PATENT DOCUMENTS

| | | |
|---|---|---|
| 0433690A2 | 6/1991 | European Pat. Off. . |
| 230954 | 2/1990 | Japan . |
| 249955 | 2/1990 | Japan . |
| 3246353 | 1/1991 | Japan . |
| 4203341 | 7/1992 | Japan . |
| 518311 | 1/1993 | Japan . |
| 2245027 | 12/1991 | United Kingdom . |
| 2251949 | 7/1992 | United Kingdom . |

Primary Examiner—Kevin L. Teska
Assistant Examiner—Stephen J. Walder, Jr.

[57] ABSTRACT

A misfire detecting method is provided for preventing erroneous detection by prohibiting misfire detection when it is judged that an internal combustion engine is operating in a particular operating condition in which load on the engine can suddenly change, wherein a processor for repeatedly executing a misfire detection process immediately ends the present cycle of the misfire detection process when it is judged that the engine has just been started (S3), when it is judged that the igniton key has just been turned off (S4), or when it is judged that the engine is decelerating, that the transmission is performing a shift operation, or that the vehicle is running on a rough road (S5–7), to thereby avoid erroneous detection which is liable to occur during rough-road travel etc.

16 Claims, 12 Drawing Sheets

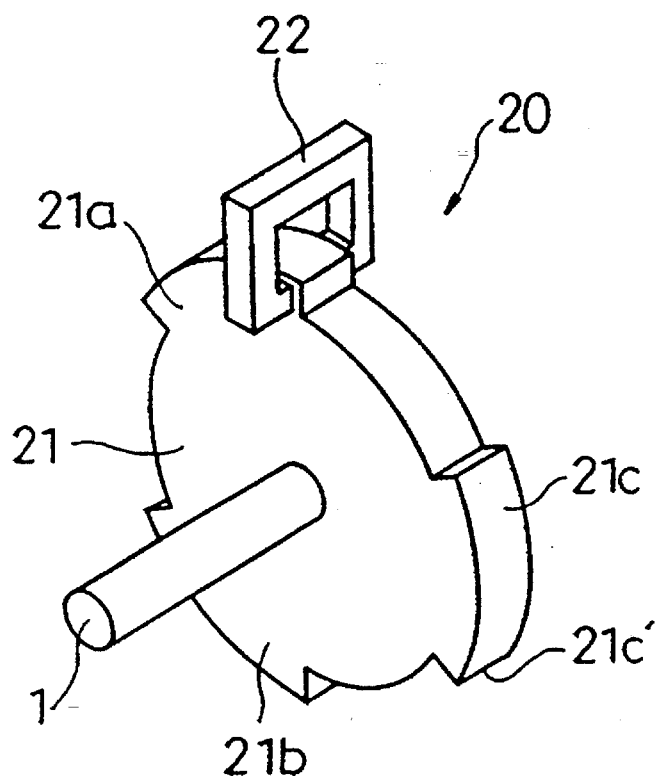
F I G. 2

MISFIRE DETECTING METHOD

TECHNICAL FIELD

The present invention relates to a misfire detecting method, and more particularly, to a misfire detecting method capable of preventing erroneous misfire detection which is liable to occur when an internal combustion engine is operating in a particular condition in which the load on the engine can suddenly change or immediately after the ignition key of the engine is turned off.

BACKGROUND ART

If, during operation of an internal combustion engine, misfire occurs, or more specifically, combustion fails to be effected normally in cylinders, due to fault of a fuel injection system or the like, emission characteristics etc. of the engine become degraded. Thus, as disclosed in Unexamined Japanese Patent Publication (KOKAI) No. 2-30954, misfire of the engine is detected based on the quantity of or the rate of change of the information, which information represents the rotational speed of the engine and which is calculated based on the period corresponding to a predetermined crank angle associated with each cylinder of the engine. In Unexamined Japanese Patent Publication (KOKAI) No. 2-49955, it is stated that, if a misfire is detected based on a variation in rotation of the internal combustion engine, i.e., a deviation of a rotary angular velocity of the engine, which is calculated at each ignition interval in a manner timed with the combustion stroke of the engine, from a rotary angular velocity calculated at the time of an immediately preceding ignition, which is used as a reference angular velocity (criterion value), an accidental misfire or a misfire occurring at a rate of 1/several rotations may fall to be detected with accuracy. To eliminate the drawback, Unexamined Japanese Patent Publication No. 2-49955 proposes updating the reference angular velocity, i.e., the criterion value, as needed.

However, when the internal combustion engine is operating in a condition in which the load on the engine can suddenly change, e.g., in a decelerating condition, or immediately after the ignition key is turned off, the angular acceleration (the rate of change in the rotational speed) of the crankshaft takes a negative value. Consequently, the angular velocity of the crankshaft may become lower than the criterion value for the misfire detection, which leads to an erroneous detection that a misfire has occurred, though in actuality no misfire is occurring. Also when the vehicle is running on a rough road, an erroneous misfire detection is likely to be made due to variation in the rotation of the output shaft of the internal combustion engine.

DISCLOSURE OF THE INVENTION

An object of the present invention is to provide a misfire detecting method capable of preventing erroneous misfire detection which is liable to occur when an internal combustion engine is operating in a particular condition in which the load on the engine can suddenly change, particularly when a vehicle is running on a rough road.

Another object of the present invention is to provide a misfire detecting method capable of preventing erroneous misfire detection which is liable to occur immediately after the ignition key of the internal combustion engine is turned off.

Still another object of the present invention is to provide a misfire detecting method capable of reliably detecting a particular operating condition of the internal combustion engine in which erroneous misfire detection is likely to occur, and thus properly carrying out misfire detection.

To achieve the above objects, the present invention provides a misfire detecting method in which misfire detection is carried out based on a rotating condition of an output shaft of an internal combustion engine, and the misfire detection is prohibited when it is determined that the internal combustion engine is operating in a particular operating condition in which load on the internal combustion engine can suddenly change.

According to one aspect of the present invention, the misfire detecting method comprises a step of determining that the internal combustion engine is operating in the particular operating condition when a motor vehicle in which the internal combustion engine is installed is running on a rough road.

Preferably, the misfire detection is carried out based on a variation in rotation of the output shaft of the internal combustion engine, and when the variation in rotation of the output shaft toward a higher-speed side is detected immediately after the variation toward a lower-speed side is detected, it is determined that the motor vehicle is running on a rough road. Still preferably, when the variation of rotation becomes greater than a predetermined rough-road discrimination value before a predetermined rough-road judgment time elapses after decreasing below a predetermined misfire discrimination value, it is determined that the motor vehicle is running on a rough road. Further, it is determined that a misfire is occurring, when the variation of rotation remains smaller than or equal to the predetermined rough-road discrimination value, though a time period longer than or equal to the predetermined rough-road judgment time has passed after decreasing below the predetermined misfire discrimination value. The variation of rotation is represented, for example, by a rotary angular acceleration of a crankshaft of the internal combustion engine.

Preferably, opening of a throttle valve of the internal combustion engine is detected, and when continual occurrence of a changeover between an opening-increasing motion and opening-decreasing motion of the throttle valve is detected based on the opening of the throttle valve, it is determined that the motor vehicle is running on a rough road. Still preferably, when the changeover between the opening-increasing motion and opening-decreasing motion of the throttle valve takes place a predetermined number of times, it is determined that the motor vehicle is running on a rough road.

Further preferably, a correction coefficient for compensating for a structural error of a sensor which is operable to detect the rotating condition of the internal combustion engine is calculated, and the rotating condition is corrected by the correction coefficient. The calculation of the correction coefficient is suspended when it is determined that the internal combustion engine is operating in the particular operating condition.

Preferably the particular operating condition is determined as being fulfilled when the internal combustion engine is deceleratingly operated or when a transmission coupled to the internal combustion engine is performing a gear changing operation, in addition to a case where the motor vehicle is running on a rough road.

According to another aspect of the present invention, the misfire detecting method comprises a step of detecting a load condition of the internal combustion engine, and a step of determining that the internal combustion engine is operating in the particular operating condition when the load condition becomes smaller than a predetermined load condition discrimination value.

Preferably, the misfire detection is prohibited for a set time period from the moment when the load condition, e.g., the volumetric efficiency of the internal combustion engine, rises above the predetermined load condition discrimination value after decreasing below the predetermined load condition discrimination value.

According to still another aspect of the present invention, the misfire detecting method comprises a step of determining that the internal combustion engine is operating in the particular operating condition, during a predetermined time period after an ignition key of the internal combustion engine is turned off.

As described above, in the misfire detecting method according to the present invention, the misfire detection is prohibited when the motor vehicle is running on a rough road. This makes it possible to prevent errors in the misfire detection carried out based on the rotating condition of the output shaft of the internal combustion engine, which errors are liable to occur during rough-road travel of the vehicle due to sudden change of the load on the engine.

According to a specific embodiment of the present invention, the misfire detection is carried out based on a variation in the rotation of the output shaft of the internal combustion engine. When a misfire occurs, the variation of rotation changes toward a lower-speed side of the engine, and thus the occurrence of misfire can be detected. However, if the misfire detection is executed immediately after the variation of rotation changes toward lower-speed side during rough-road travel, such detection can be erroneous. That is, in general, during rough-road travel, the variation in rotation of the output shaft of the internal combustion engine alternately changes toward higher-speed side and lower-speed side, though misfire is not actually occurring. In this specific embodiment of the present invention, it is judged that the motor vehicle is running on a rough road when the variation of rotation toward higher-speed side is detected immediately after the variation of rotation toward lower-speed side is detected, whereby rough-road travel can be reliably detected. Since the misfire detection is prohibited when a rough-road travel is detected, erroneous detection can be prevented.

According to a preferred embodiment of the present invention wherein it is judged that the vehicle is running on a rough road when the variation of rotation rises above the predetermined rough-road discrimination value after it once decreases below the predetermined misfire discrimination value and before the predetermined rough-road judgment time elapses, rough-road travel can be more reliably detected based on the phenomenon peculiar to rough-road travel that the variation in rotation of the output shaft of the engine alternately changes toward higher-speed side and lower-speed side to a considerable extent. Even if the variation of rotation once decreases below the misfire discrimination value and thus it is judged that there is a high probability of a misfire occurring, the misfire detection is prohibited when rough-road travel is thereafter detected, whereby erroneous detection can be prevented.

According to another embodiment of the present invention, it is judged that a misfire is occurring when the variation of rotation remains smaller than or equal to the rough-road discrimination value after it decreases below the predetermined misfire discrimination value, though the predetermined rough-road judgment time has passed. For the reason similar to that pointed out in connection with the aforementioned embodiment, when it is judged that there is a high probability of a misfire occurring, misfire is conclusively determined, in this embodiment, on condition that rough-road travel is not detected thereafter, whereby misfire can be detected with reliability during rough-road travel.

The rotary angular acceleration of the crankshaft of the internal combustion engine instantly represents variation in the rotation of the output shaft of the engine. Accordingly, the misfire detecting method according to the preferred embodiment of the invention in which misfire is detected based on the variation of rotation represented by the rotary angular acceleration of the crankshaft has excellent response to the variation in rotation of the output shaft.

Generally, during rough-road travel, the accelerator pedal is frequently and alternately depressed and released by the driver. According to another specific embodiment of the present invention, rough-road travel is detected when the throttle valve continually and alternately makes opening-increasing motion and opening-decreasing motion, particularly when changeover between the opening-increasing motion and opening-decreasing motion of the throttle valve takes place a predetermined number of times. Therefore, rough-road travel can be reliably detected when the accelerator operation peculiar to rough-road travel is performed.

According to another embodiment of the present invention, it is judged that the particular operating condition is fulfilled when the engine is deceleratingly operated or the transmission coupled to the engine is performing a gear changing operation, in addition to the case where the vehicle is running on a rough road. Consequently, the misfire detection is prohibited during the decelerated engine operation or during the gear changing operation. Thus, erroneous misfire detection based on the rotating condition of the output shaft of the engine, caused by reduction in the torque of the output shaft due to decelerated engine operation or the like, can be prevented.

According to still another aspect of the present invention, it is judged that the internal combustion engine is operating in the particular operating condition when the predetermined time has not passed after the ignition key of the engine is turned off, whereby erroneous detection caused due to reduction in the torque of the output shaft of the engine after turning-off operation of the ignition key can be prevented.

According to a preferred embodiment of the present invention wherein the rotating condition of the internal combustion engine is corrected by the correction coefficient, error in the detection of the rotating condition caused due to structural error of a sensor for detecting the rotating condition is eliminated, and thus the accuracy of the misfire detection based on the rotating condition is improved. According to an embodiment in which the calculation of the correction coefficient is suspended during the particular operating condition, error in the calculation of the correction coefficient during the particular operation condition, in which the crankshaft rotation is not steady and it is not possible to obtain a correction coefficient exactly representing the sensor error, is avoided, and thus erroneous misfire detection can be prevented.

According to a further aspect of the present invention wherein it is judged that the internal combustion engine is operating in the particular operating condition when the detected load condition of the engine becomes smaller than the predetermined load condition discrimination value, entry to a load condition in which erroneous detection is likely to occur, i.e., entry to the particular operating condition, can be determined with accuracy. In addition, proper misfire detection is ensured by prohibiting the misfire detection when the particular operating condition is detected.

Furthermore, in another specific embodiment according to the present invention, the misfire detection is prohibited for the set time period from the moment when the load condition, e.g., the volumetric efficiency of the internal combustion engine, rises above the predetermined load condition discrimination value after it decreases below the same discrimination value. This permits accurate determination of the engine being deceleratingly operated and of a gear changing operation of the transmission being performed, whereby erroneous misfire detection during the decelerated engine operation and the gear changing operation can be prevented.

BRIEF DESCRIPTION OF THE DRAWINGS

FIG. 2 is a perspective view of a crank angle sensor in the system shown in FIG. 1;

BEST MODE OF CARRYING OUT THE INVENTION

A misfire detecting method according to a first embodiment of the present invention, which utilizes variation in the rotation of a crankshaft for misfire detection, will be now described.

Figure 1:
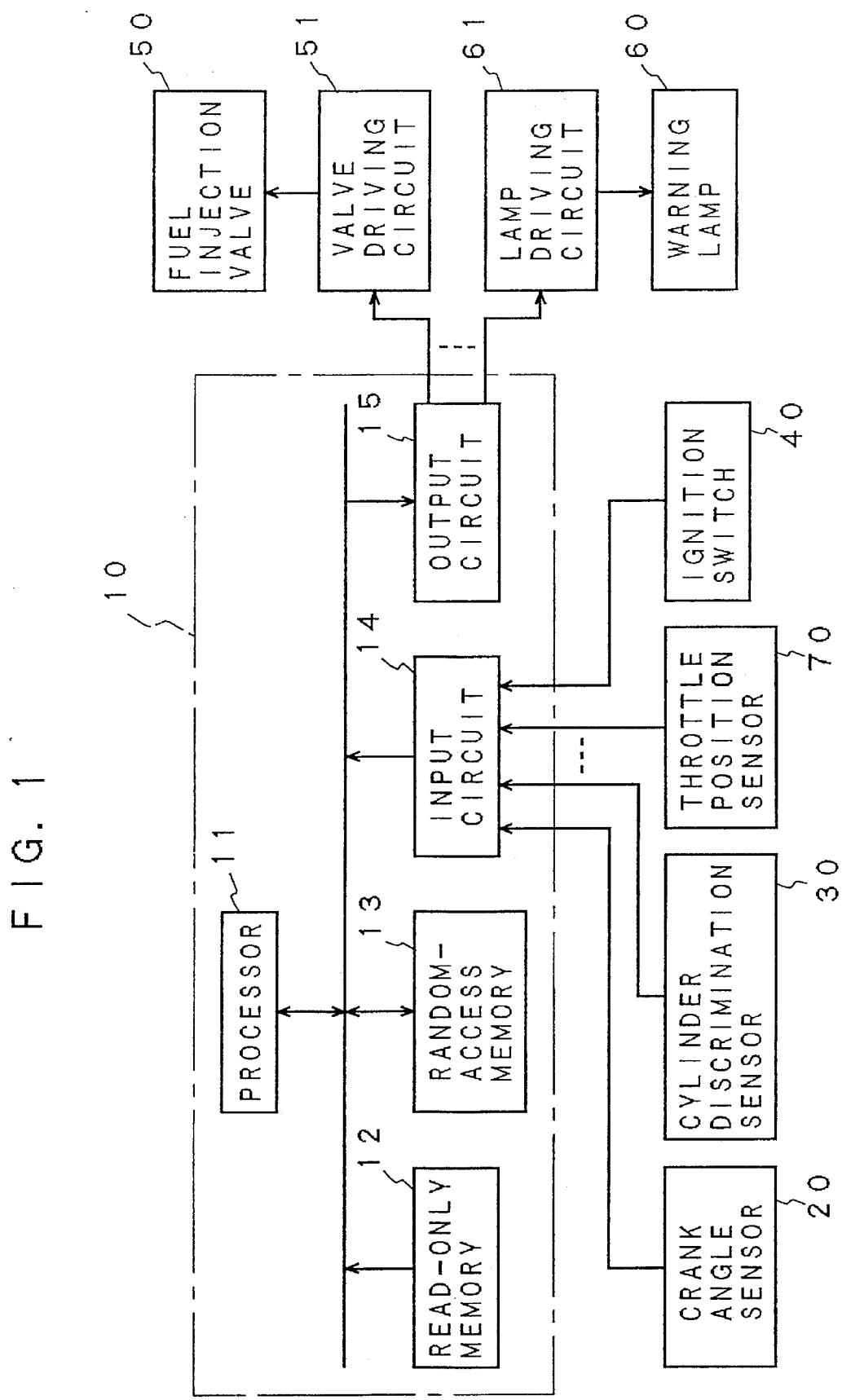
FIG. 1 is a block diagram schematically illustrating a system for carrying out a misfire detecting method according to a first embodiment of the present invention.

A system for carrying out the misfire detecting method according to this embodiment is installed in an internal combustion engine, e.g., a 6-cylinder engine (not shown), and comprises a controller 10, a crank angle sensor 20 and a cylinder discrimination sensor 30 as its principal elements, as shown In FIG. 1.

Referring to FIG. 2, the crank angle sensor 20 has a rotary member 21 disposed for rotation in unison with a crankshaft 1 of the engine, and a detecting section 22 disposed to face the rotary member 21. The rotary member 21 is formed at its peripheral edge with first, second, and third vanes 21a, 21b and 21c projecting therefrom in the radius direction of the crankshaft. The sensor is operable to output a pulse when the detecting section 22 optically or electromagnetically detects a passage of the vane 21a, 21b or 21c thereby. The first, second and third vanes 21a, 21b and 21c each have a circumferential length corresponding to a certain angle of rotation of the crankshaft, and are set apart from each other In the circumferential direction at a predetermined angle. Thus, the angle between the corresponding edges of adjacent vanes is 120 degrees. In practice, however, the angle between the corresponding edges of adjacent vanes may not exactly be 120 degrees, due to structural error of the crank angle sensor 20, in particular, due to error caused during the manufacture and mounting of the vanes 21a, 21b and 21c. Generally, the angle between the vanes has an error of approximately 1 degree or less.

The cylinder discrimination sensor 30 is mounted to a camshaft, not shown, to be rotated therewith, and is operable to output a pulse each time the camshaft rotates through a particular rotational position corresponding to one of the cylinders, during one rotation thereof while the crankshaft 1 makes two rotations.

The controller 10 functions as a principal element of the misfire detecting system and is designed to execute a variety of normal engine control operations. The controller 10 comprises a processor 11 for executing various control programs, a read-only memory 12 storing the control programs, and a random-access memory 13 for temporary storage of data, etc. The memory 13 has a nonvolatile memory area backed up by a battery, not shown. The processor 11 is connected, via an input circuit 14, to various sensors and switches (only some of them are shown) including the crank angle sensor 20, the cylinder discrimination sensor 30, an ignition switch (ignition key) 40, an intake air quantity sensor, an intake air temperature sensor, a water temperature sensor, etc., and is also connected, via an output circuit 15, to various driving circuits (only those associated with the below-mentioned elements 50 and 60 are illustrated at 51 and 61, respectively) for driving various actuators including fuel injection valves 50, and for driving a warning lamp 60, etc. In FIG. 1, reference numeral 70 denotes a throttle position sensor which is used in a second embodiment of the present invention, described later, and the sensor 70 is connected to the processor 11 through the input circuit 14.

The system of this embodiment, which 1s installed in a 6-cylinder engine wherein ignition is executed in order of the cylinder number, is designed such that, when the edge (leading edge 21c' or trailing edge) of the third vane 21c, for example, passes the detecting section 22, the crankshaft enters a first crankshaft rotary angular range associated with either one of the first and fourth cylinders (preferably, corresponding mainly to the expansion stroke of the cylinder concerned) forming a first cylinder group, and when the edge of the first vane 21a passes the detecting section 22, the crankshaft leaves the first crankshaft angular range. Similarly, when the edge of the first vane 21a passes the section 22, the crankshaft enters a second crankshaft angular range associated with either one of the second and fifth cylinders forming a second cylinder group, and when the edge of the second vane 21b passes the section 22, the crankshaft leaves the second angular range. Further, when the edge of the second vane 21b passes the section 22, the crankshaft enters a third crankshaft angular range associated with either one of the third and sixth cylinders forming a third cylinder group, and when the edge of the third vane 21c passes the section 22, the crankshaft leaves the third angular range. Discrimination between the first and fourth cylinders, discrimination between the second and fifth cylinders, and discrimination between the third and sixth cylinders are made based on the output of the cylinder discrimination sensor 30.

Figure 3:
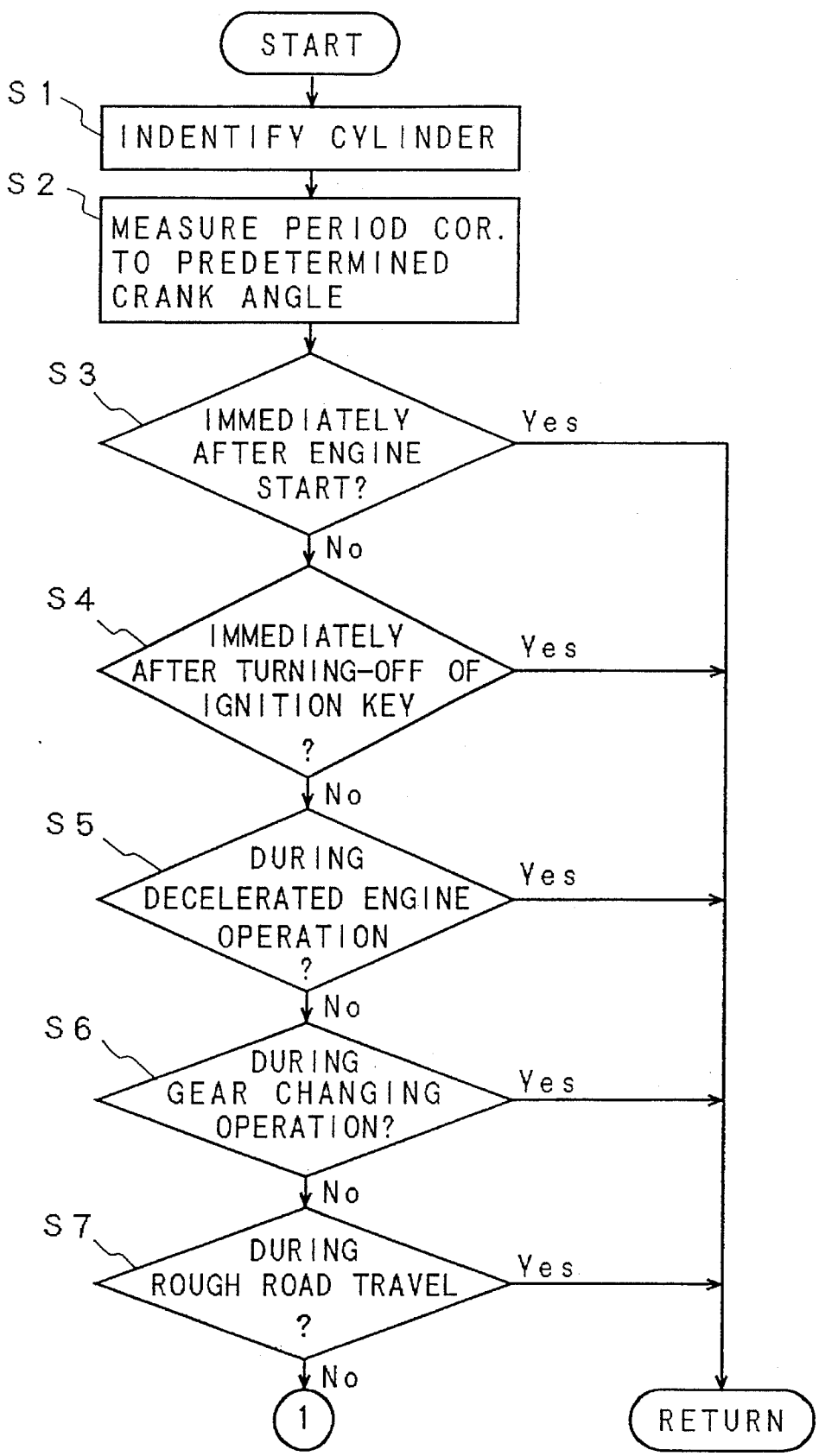
FIG. 3 is a flowchart showing part of a misfire detection process executed by a controller shown in FIG. 1.
Figure 4:
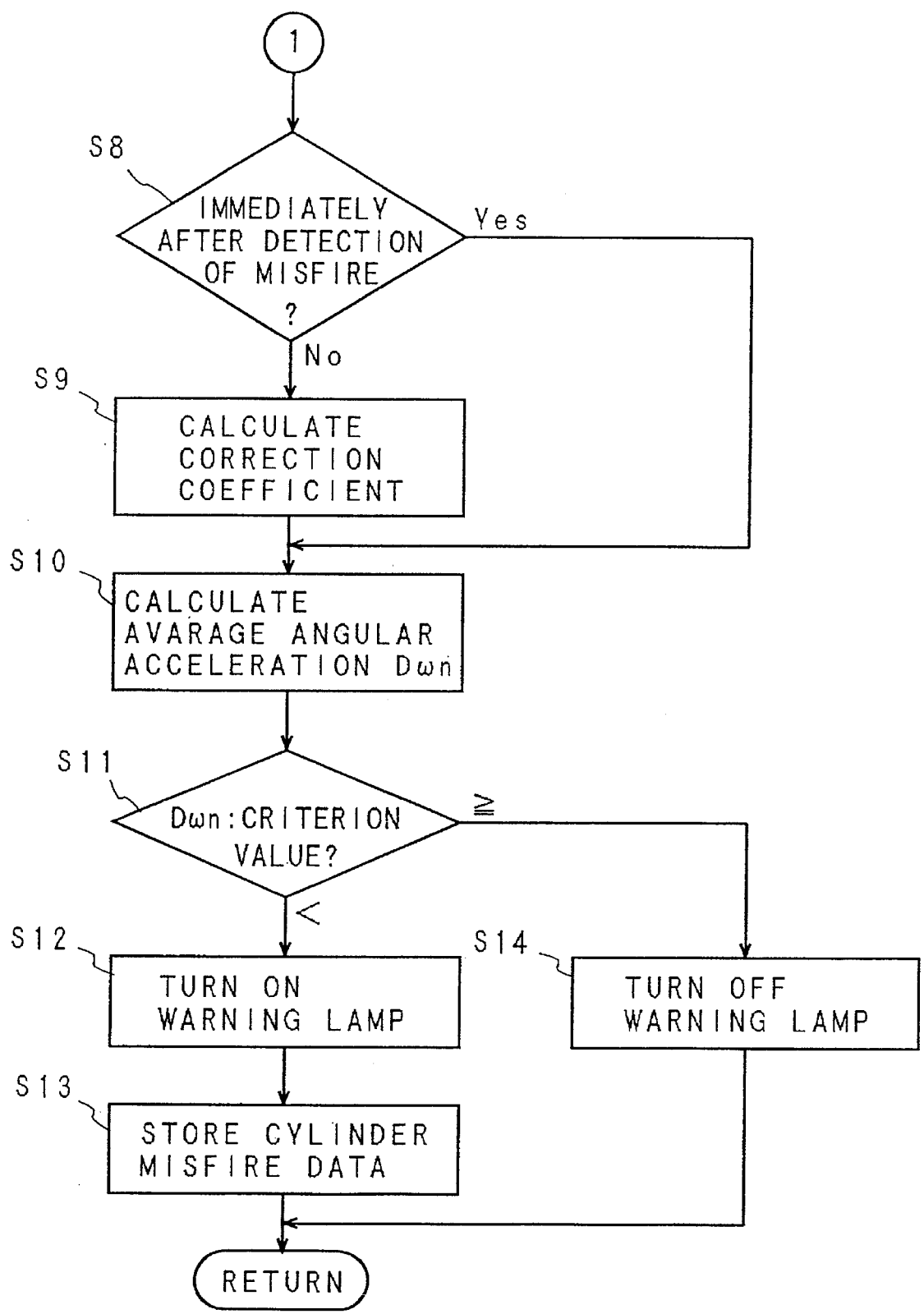
FIG. 4 is a flowchart showing the remaining part of the misfire detection process, following the part shown In FIG. 3.

Referring now to FIGS. 3 and 4, operation of the misfire detecting system constructed as above will be summarized.

During operation of the engine, the processor 11 periodically executes a misfire detection process shown in FIGS. 3 and 4, while being successively supplied with pulses from the crank angle sensor 20 and pulses from the cylinder discrimination sensor 30.

The processor 11 starts the misfire detection process each time it is supplied with a pulse from the crank angle sensor 20.

In each detection cycle, first, the processor 11 determines the order or place of the pulse output from the crank angle sensor, among a series of pulses successively supplied from the crank angle sensor after a pulse is supplied from the cylinder discrimination sensor 30, thereby identifying the cylinder number corresponding to the pulse supplied from the crank angle sensor (Step S1). Preferably, that cylinder which is under expansion stroke (output stroke) is detected as an identified cylinder. The processor 11 restarts a period measurement timer (not shown) on detecting entry of the crankshaft to the crankshaft angular range associated with an identified cylinder group m (m=1, 2 or 3) based on the pulse supplied from the crank angle sensor 20. The identified cylinder group m includes the cylinder identified in Step S1.

On receiving the subsequent pulse from the crank angle sensor 20, the processor 11 judges that the crankshaft has just left the crankshaft angular range associated with the identified cylinder group m, and stops the operation of the period measurement timer to read the result of the measurement (Step 2). The result of the measurement represents a time interval $T_{m(n)}$ between the entry to the crankshaft angular range associated with the identified cylinder group m and the departure from the same angular range, i.e., the period $T_{m(n)}$ determined by two predetermined crank angles associated with the identified cylinder group. Here, the subscript "n" in the period $T_{m(n)}$ indicates that the period concerned corresponds to the nth (present) ignition of the identified cylinder. The period $T_{m(n)}$ is equivalent to the period corresponding to 120 degrees of crank angle of the identified cylinder group in the case of a 6-cylinder engine, and more generally, is equivalent to the period corresponding to (720/N) degrees of crank angle in the case of an N-cylinder engine.

The pulse representing departure from the crankshaft angular range associated with the presently identified cylinder also represents entry to the crankshaft angular range associated with the subsequently identified cylinder. Accordingly, in response to the output pulse, Step S1 is executed to make a cylinder discrimination for the next identified cylinder, and also the period measurement timer is restarted to measure the period associated with the next identified cylinder.

Subsequently, the processor 11 determines whether or not the engine is in a state being started or immediately after the start (Step S3). If the engine is being started or just has been started, the processor 11 forcibly ends the present cycle of misfire detection. The reason for the forcible termination will be explained. In Step S9 (FIG. 4) for calculating a correction coefficient, mentioned later, the sum of the periods corresponding to the 120-degree crank angles of the first to third cylinder groups, i.e., the period corresponding to 360 degrees of crank angle, 1s divided by "3", and the resulting value is used as representing an accurate period equivalent to 120 degrees of crank angle. However, in order for the value obtained by dividing the sum of the periods corresponding to three 120-degree crank angles by "3" to be an accurate period equivalent to 120 degrees of crank angle, the rotational speed of the engine need be substantially constant. This requirement is not met in cases where the rotational speed of the engine suddenly changes, for example, at or immediately after the start of the engine. Consequently, in this embodiment, the misfire detection is prohibited when the engine is operating in such condition.

If it is judged in Step S3 that the engine is neither being started nor has just been started, the processor 11 determines whether or not the ignition key is in a state being turned off or immediately after the turn-off operation (Step S4). Immediately after the ignition key is turned off, the engine is allowed to run idle while the controller 10 and the various sensors remain actuated for a certain length of time. While the engine runs idle, the engine speed sharply decreases; therefore, the correction coefficient, and thus variation in rotation of the crankshaft, cannot be obtained with accuracy. Accordingly, the misfire detection cannot be properly carried out. In this embodiment, therefore, the misfire detection is prohibited when the ignition key is being turned off or has just been turned off.

Figure 5:
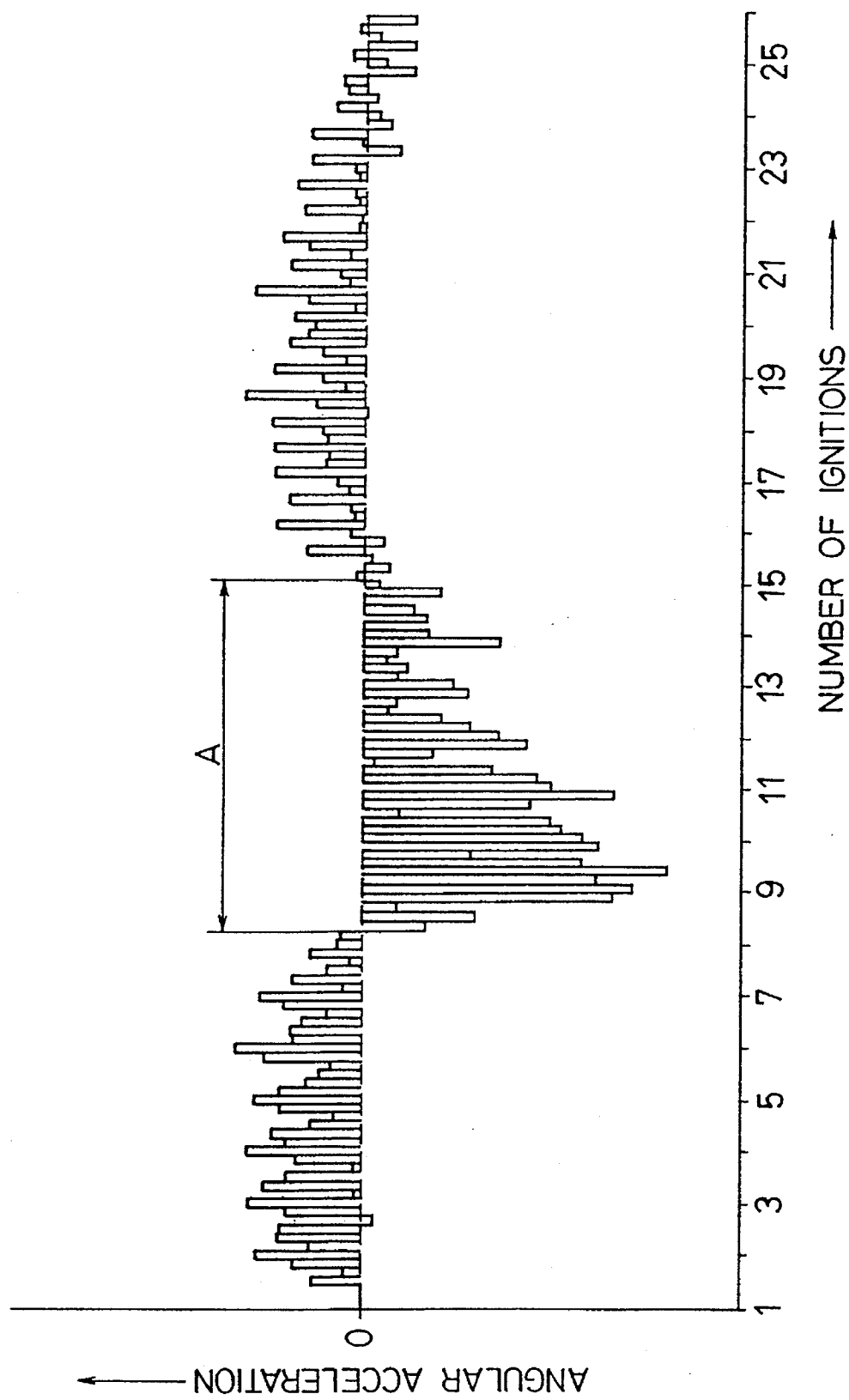
FIG. 5 is a graph showing, by way of example, change in angular acceleration during decelerated engine operation.

Then, the processor 11 determines whether the engine is deceleratingly operated (Step S5). If the engine is decelerating, the present cycle of misfire detection is immediately ended, whereby the misfire detection is prohibited during a decelerating condition, indicated by interval A in FIG. 5, in which erroneous misfire detection is likely to be caused because the angular acceleration (corresponding to an average angular acceleration D ω of this embodiment) deviates toward the negative side by a large margin. If it is judged that the engine is not decelerating, the processor 11 determines whether a transmission (not shown) coupled to the engine is performing a shift operation (gear changing operation) (Step S6).

Figure 6:
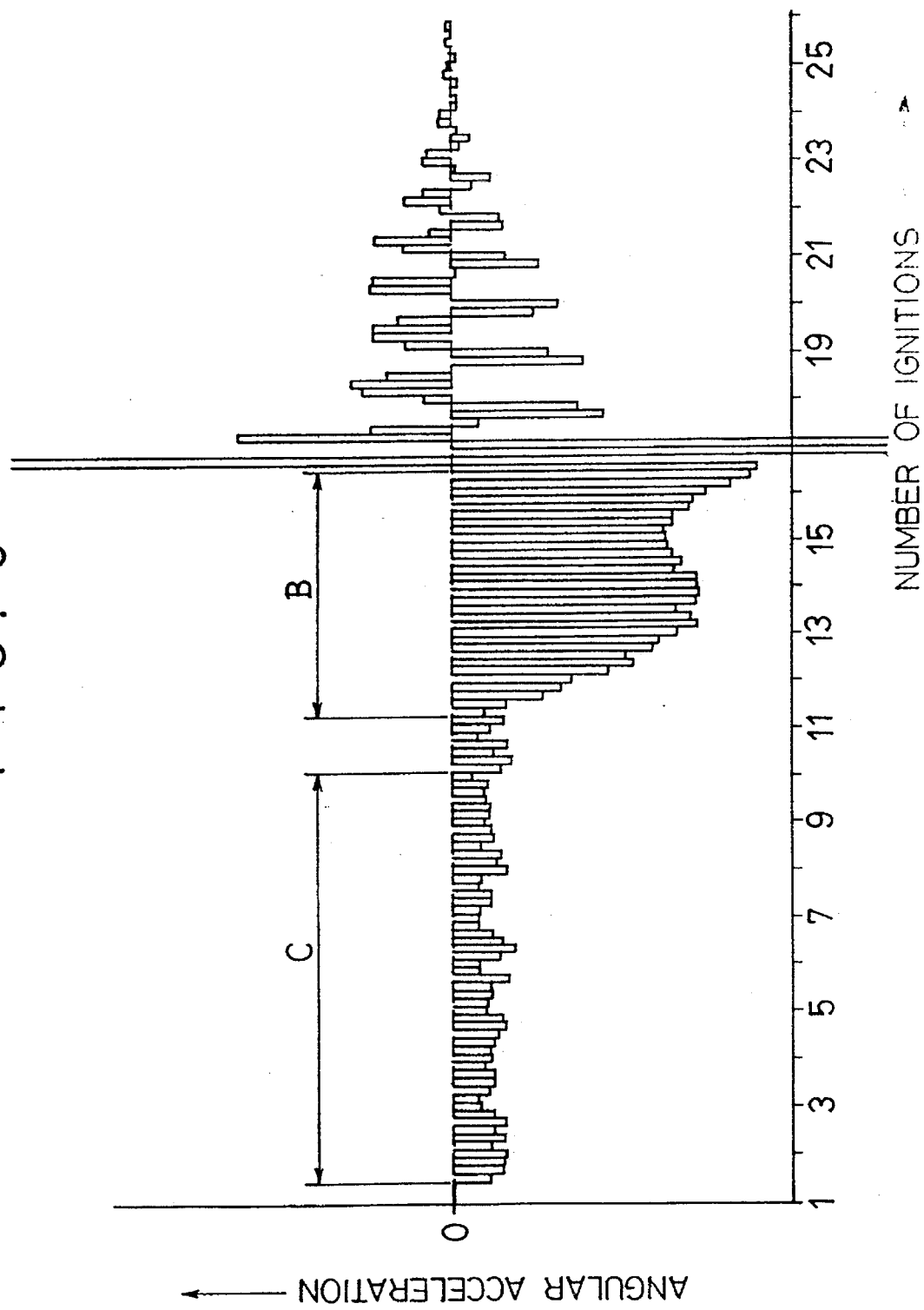
FIG. 6 is a graph showing, by way of example, change in the angular acceleration during shift operation.

If shift operation is in progress, the present cycle of misfire detection is immediately ended, whereby the misfire detection is prohibited during a clutch engaging operation of a manual transmission (more generally, during a shift operation of the transmission), indicated by interval B in FIG. 6, in which erroneous misfire detection is likely to be caused because the angular acceleration deviates toward the negative side by a large margin. In FIG. 6, interval C represents a deceleratingly operated condition of the engine preceding the clutch engaging operation. If it is judged that no shift operation is under way, the processor 11 determines whether a motor vehicle in which the engine is installed is running on a rough road (Step S7).

Figure 7:
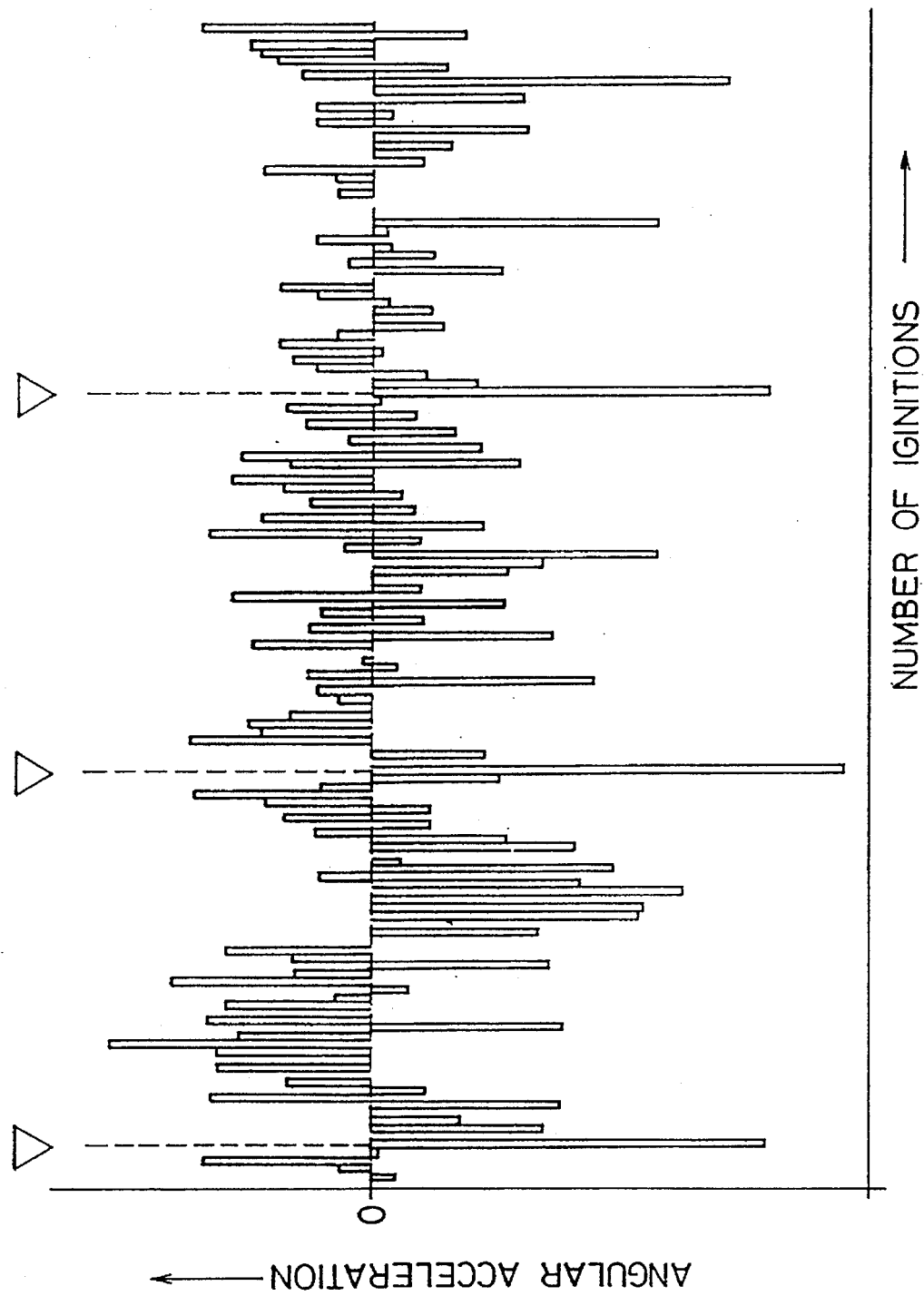
FIG. 7 is a graph showing, by way of example, change in the angular acceleration during rough-road travel.

If the motor vehicle is running on a rough road, the present cycle of misfire detection is immediately ended, whereby the misfire detection is prohibited during an off-road travel in which erroneous misfire detection is likely to be caused because the angular acceleration fluctuates in both the positive and negative directions by a large margin, as shown in FIG. 7. In FIG. 7, the triangles each indicate an instant at which the angular acceleration greatly drops due to the occurrence of an actual misfire. If, on the other hand, the motor vehicle is not running on a rough road, that is, if the results of the decisions in Steps S3 through S7 are all No, the processor 11 determines whether or not an occurrence of a misfire is being detected or has just been detected (Step S8).

If it is judged in Step S8 that an occurrence of a misfire is neither being detected nor has just been detected, the processor 11 calculates a correction coefficient $K_{Lm(n)}$ associated with the identified cylinder group m, according to the equation $$K_{Lm(n)} = a \cdot K_{Lm}(n-1) + (1-a) \cdot K_{Lm},$$

to eliminate a period measurement error caused by variation in the angular distance between the vanes due to manufacturing or mounting error of the vanes (Step S9). In the equation, symbol "a" is a filter constant stored beforehand in the memory 12, and has a value greater than or equal to "0" and smaller than or equal to "1". Symbol $K_{Lm}(n-1)$ represents the correction coefficient associated with the identified cylinder group m, which was calculated in the preceding detection cycle and is stored in the memory 13, and $K_{Lm}$, represents the value calculated according to the equation $$K_{Lm} = T_{m(n)} \div (T_{(n)}/3).$$

As mentioned above, symbol $T_{m(n)}$ represents the presently detected period corresponding to the 120-degree crank angle of the identified cylinder group m. Symbol $T_{(n)}$ represents the sum of the periods corresponding to the 120-degree crank angles of the first to third cylinder groups measured successively in the preceding two detection cycles and the present detection cycle, respectively, i.e., the period corresponding to 360 degrees of crank angle ($T_{(n)} = T_{1(n)} + T_{2(n)} + T_{s(n)}$). If the rotational speed of the engine remains the same, the value $T_{(n)}/3$ obtained by dividing the period corresponding to the 360-degree crank angle by the value "3" is equal to an exact 120-degree crank angle, which is provided in a case where there is no error in the angular distance between the vanes. Accordingly, the calculated value $K_{Lm}$ indicates the ratio of the period corresponding to the 120-degree crank angle of the identified cylinder group m to the period corresponding to the accurate 120-degree crank angle.

Further, the processor 11 calculates an average angular velocity ωn (=120 degrees/$T_n$) of the crankshaft associated with the present cycle, based on the period $T_n (= T_{m(n)})$ corresponding to the 120-degree crank angle, detected in Step S2 of the present detection cycle, and reads the period $T_{n-1}$ and average angular velocity ωn−1 measured or calculated in the preceding detection cycle and stored in the memory 13. Subsequently, using the measured values $T_n$ and $T_{n-1}$, the calculated values ωn and ωn−1, and the correction coefficient $K_{Lm(n)}$ calculated in Step S9, the processor 11 computes an average angular acceleration Dωn of the crankshaft during the period corresponding to the 120-degree crank angle associated with the present detection cycle, according to the following equation (Step S10):

$$D\omega n = K_{Lm(n)} \cdot (\omega_n - \omega_{n-1}) \div \{(1/2) \cdot (T_n + T_{n-1})\}$$

where symbol D is the differential operator and represents d/dt. In this manner, the angular acceleration of the crankshaft is obtained based on the measured period which has been corrected by using the correction coefficient $K_{Lm(n)}$.

If it is judged in Step S8 that an occurrence of a misfire is being detected or has just been detected, the processor 11 immediately executes Step S10 to calculate the average angular acceleration, without executing the correction coefficient calculation Step S9, on the assumption that the engine rotation is fluctuating due to the occurrence of a misfire. In this case, the processor computes the average angular acceleration Dωn, using the latest correction coefficient $K_{Lm}$ calculated in the preceding or an earlier detection cycle and stored in the nonvolatile memory area of the memory 13.

The processor 11 then compares the average angular acceleration Dωn with a criterion value stored beforehand in the memory 12 for the determination of misfire, to determine a magnitude relation therebetween (Step S11). The criterion value is set to a negative value. If it is judged that the angular acceleration Dωn is smaller than the criterion value, the processor 11 supplies, e.g., a high (H)-level drive signal, to the lamp driving circuit 61 to light the warning lamp 60, thereby notifying the driver of the occurrence of a misfire in the identified cylinder (Step S12), and stores, in the memory 13, data indicating that a misfire has occurred in the cylinder identified in Step S1 (Step S13). On the other-hand, if it is judged in Step S11 that the average angular acceleration Dωn of the crankshaft is greater than or equal to the criterion value, the processor 11 outputs, e.g., a low (L)-level drive signal, to turn off the warning lamp 60, thereby notifying the driver that no misfire is occurring in the identified cylinder (Step S14).

After the cylinder misfire data is stored in Step S13 or the warning lamp is turned off in Step S14, the processor 11 stands by for the supply of the subsequent pulse from the crank angle sensor 20, and on receiving the pulse, restarts the process shown in FIGS. 3 and 4.

In this manner, the misfire detection is repeated for each of the cylinders, and execution of the misfire detection is prohibited (masked) when the engine has just been started, when the ignition key has just been turned off, when the engine is deceleratingly operated, when the transmission is performing a shift operation, or when the vehicle is running on a rough road.

Figure 8:
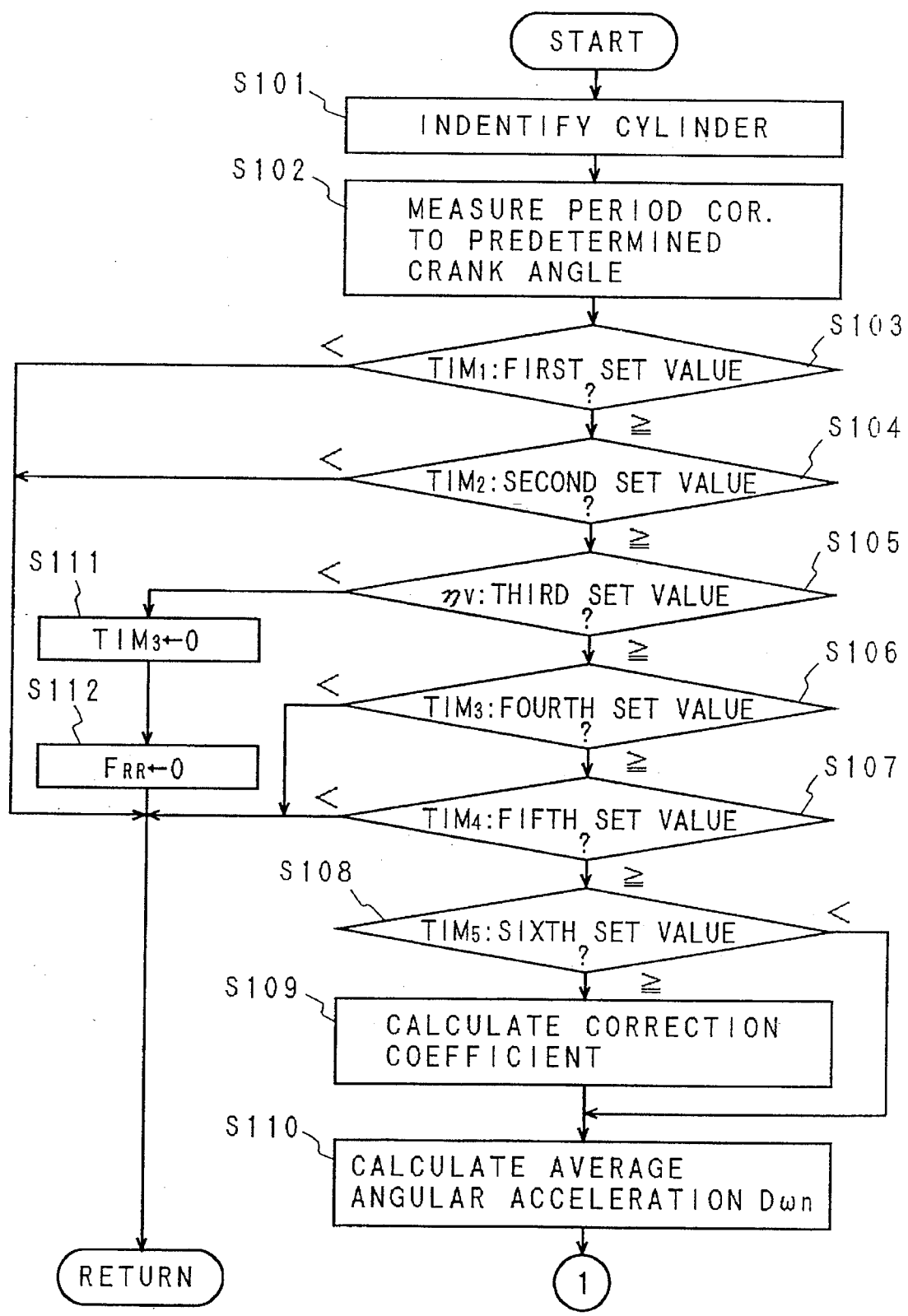
FIG. 8 is a flowchart showing part of a misfire detection process including steps for discriminating decelerated operation, shift operation, and rough-road travel.
Figure 9:
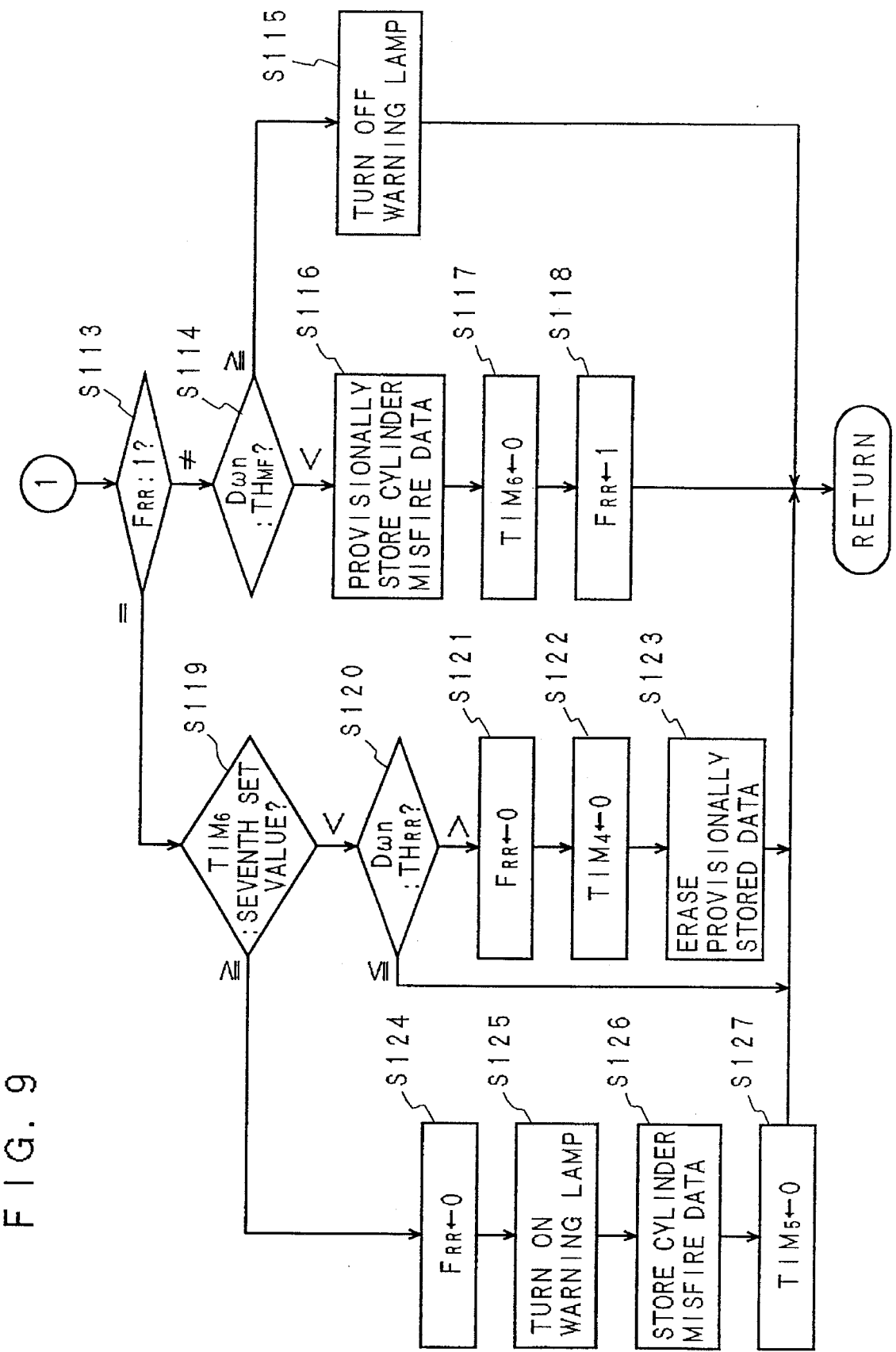
FIG. 9 is a flowchart showing the remaining part of the misfire detection process, following the part shown in FIG. 8.
Figure 10:
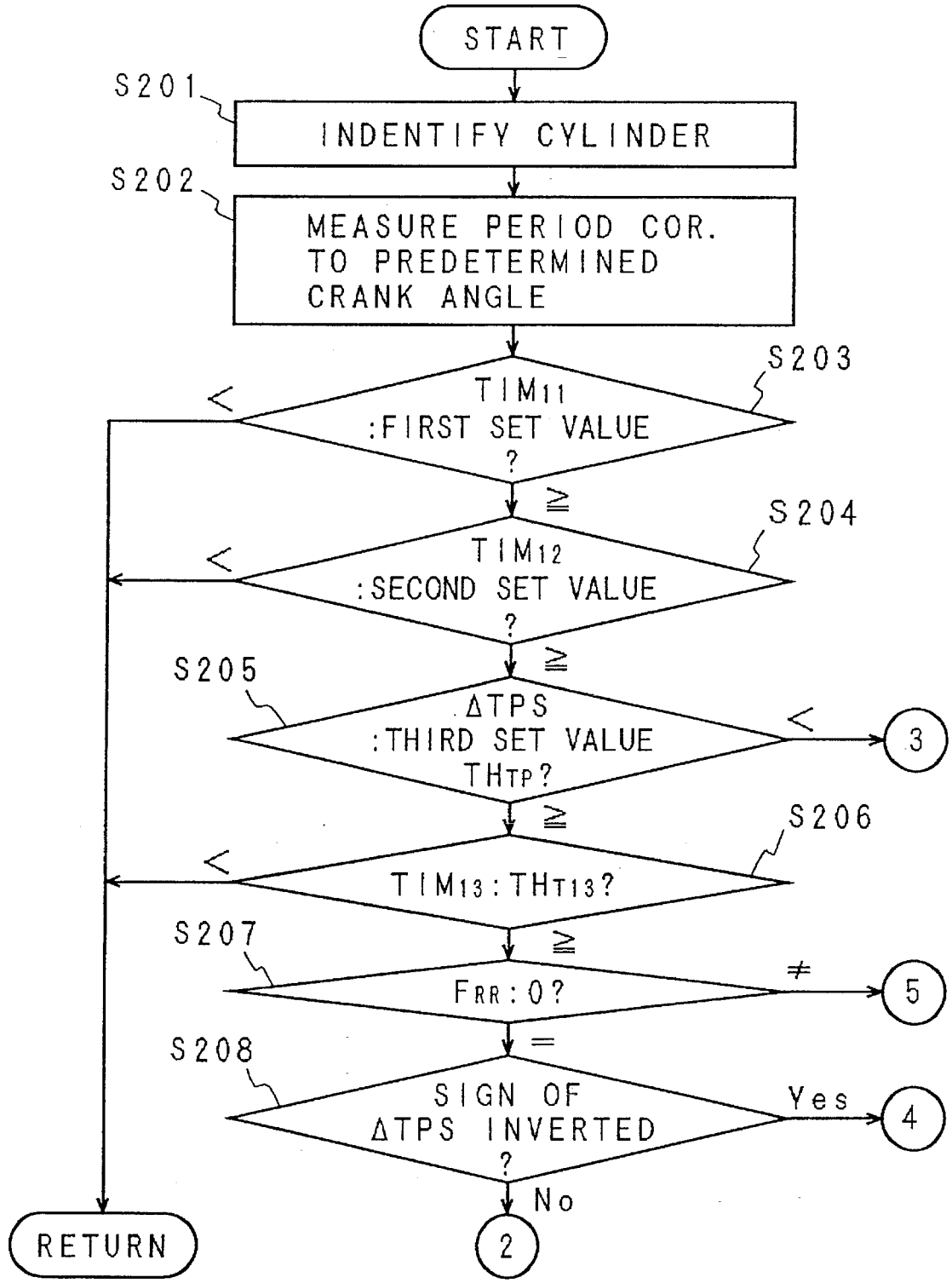
FIG. 10 is a flowchart showing part of a misfire detection process executed in a misfire detecting method according to a second embodiment of the present invention.

Referring now to FIGS. 8 and 9, the misfire detection procedure, particularly the rough-road travel detection. procedure, will be explained in detail.

In each cycle of the misfire detection process (FIGS. 8 and 9) which is repeatedly executed, the processor 11 successively executes a cylinder discrimination Step S101 and a period measurement Step S102 corresponding, respectively, to Steps S1 and 2 in FIG. 3. Then, the processor 11 compares an elapsed time $TIM_1$, obtained by referring to a first timer (not shown) for measuring the time $TIM_1$, elapsed from the engine start, with a first set value, to thereby determine whether the engine is in a state being started or immediately after the start (Step S103). The first set value is a value equivalent to a time period (10 to 30 seconds) slightly longer than the time which is usually required for the engine to attain a steady-state rotation after being started. The first timer is restarted under the control of the processor 11 when the ignition key 40 is shifted from the OFF to ON position to start the engine (when the engine is started) (the control procedure related to the restart of the first timer is omitted for simplicity of illustration).

If the elapsed time $TIM_1$, is longer than or equal to the set value, and thus it is judged in Step S103 that the engine is not in a state immediately after the start, the processor 11 compares an elapsed time $TIM_2$, obtained by referring to a second timer (not shown) for measuring the time $TIM_2$ elapsed from the turning-off operation of the ignition key, with a second set value, to thereby determine whether the ignition key is being turned off (or has been just turned off) (Step S104). Although not illustrated, the second timer for measuring the elapsed time $TIM_2$ is restarted when the ignition key 40 is shifted from the ON to OFF position. The second set value is a value equivalent to a time period slightly longer than the period which is usually required after the ignition key is turned off until the engine rotation stops and the controller 10 and the like are rendered inoperative so that the misfire detection is no longer executed.

If it is judged in Step S103 that the time $TIM_1$ elapsed from the engine start is shorter than the first set value, and thus the engine has just been started, or if it is judged in Step S104 that the time $TIM_2$ elapsed from the turning-off operation of the ignition key is shorter than the second set value, and thus the ignition key has just been turned off, the present cycle of the misfire detection process is immediately ended.

On the other hand, if it is judged in Step S103 that the engine has not just been started, and subsequently it is judged in Step S104 that the elapsed time $TIM_2$ is longer than or equal to the second set value, i.e., the ignition key has not just been turned off, the processor 11 first detects the engine load condition based on the detection outputs from the airflow sensor, suction pressure sensor, throttle sensor, etc. In this embodiment, a volumetric efficiency $\eta_v$ of the engine, which represents the engine load condition, is calculated. In the case of using the airflow sensor for the detection of the engine load condition, the processor 11 first obtains an intake air quantity A/N per suction stroke, based on the outputs from the airflow sensor and engine speed sensor, and divides the quantity A/N by a full-open quantity A/N which is obtained in a throttle full-open state at the same engine speed, to thereby obtain a value equivalent to the nondimensional volumetric efficiency. Subsequently, the processor 11 compares the volumetric efficiency thus calculated with a third set value (e.g., 18%) corresponding to a volumetric efficiency which represents an engine decelerating condition, to thereby determine whether the engine is decelerating (Step S105). If it is judged in Step S105 that the calculated value of the volumetric efficiency $\eta_v$ is greater than or equal to the third set value, and thus the engine is not decelerating, the processor 11 compares a time $TIM_3$ elapsed from the entry to decelerating condition, obtained by referring to a third timer (not shown), with a fourth set value corresponding to a time period which is usually required after the entry to decelerating condition until shift operation is completed (Step S106). If it is judged in Step S106 that the elapsed time $TIM_3$ is longer than or equal to the fourth set value, and thus no shift operation of the transmission is in progress, the processor 11 compares a time $TIM_4$ elapsed from the moment when the motor vehicle making rough-road travel was detected, which time is obtained by referring to a fourth timer (not shown), with a fifth set value representing a time period for which the misfire detection is prohibited in relation to rough-road travel (Step S107).

If it is judged in Step S107 that the elapsed time $TIM_4$ is longer than or equal to the fifth set value, and thus the misfire detection prohibit time has already elapsed, the processor 11 successively executes Steps S108 to S110 corresponding, respectively, to Steps S8 to S10 in FIG. 4. In brief, the processor 11 first obtains a time $TIM_5$ elapsed after the detection of an occurrence of misfire, by referring to a fifth timer (not shown) which is restarted when the occurrence of a misfire is detected, as described later, and then compares the elapsed time $TIM_5$ with a sixth set value representing a time period for which the calculation of the correction coefficient is prohibited in relation to a misfire occurring (Step S108). If it is judged in Step S108 that the elapsed time $TIM_5$ is longer than or equal to the sixth set value, and thus the correction coefficient calculation prohibit time has already elapsed, the processor 11 computes the correction coefficient $K_{Lm(n)}$ for the cylinder group m identified in the present detection cycle, and also computes the average angular acceleration $D\omega n$ of the crankshaft during the period corresponding to the 120-degree crank angle associated with the present detection cycle (Steps S109 and S110). On the other hand, if it is judged in Step S108 that the elapsed time $TIM_5$ is shorter than the sixth set value, and thus the correction coefficient calculation prohibit time is not yet passed, the processor 11 immediately executes Step S110, without executing Step S109.

If it is judged in Step S105 that the calculated value of the volumetric efficiently $\eta_v$ is smaller than the set value, and thus the engine is decelerating, the processor 11 restarts the third timer for measuring the time $TIM_3$ elapsed from the entry to decelerating condition (Step S111), resets a flag $F_{RR}$ to "0" which value indicates that the judgment to see whether rough-road travel is being made is not under execution (Step S112), and then immediately ends the present cycle of misfire detection. Namely, the detection of misfire is prohibited during deceleration of the engine.

If it is judged in Step S106 that the time $TIM_3$ elapsed from the entry to decelerating condition is shorter than the fourth set value, and thus a shift operation of the transmission is in progress, the processor 11 immediately ends the present cycle of misfire detection, thus prohibiting the misfire detection during shift operation. When it is judged in Step S107 that the time $TIM_4$ elapsed from the moment when the motor vehicle making rough-road travel was detected is shorter than the fifth set value, and thus the misfire detection prohibit time associated with rough-road travel has not yet passed, the processor 11 immediately ends the present cycle of misfire detection, thereby prohibiting execution of the misfire detection.

On the other hand, when the misfire detection need be executed, the processor 11 determines whether the flag $F_{RR}$ is set to "1" which value indicates that the judgement of rough-road travel is under execution (Step S113), after calculating the average angular acceleration $D\omega n$ in Step S110. If $F_{RR} \neq 1$, that is, if it is judged in Step S113 that the judgement of rough-road travel is not under execution, the processor 11 compares the calculated angular acceleration $D\omega n$ with a misfire discrimination level (criterion value) $TH_{MF}$ (<0) (Step S114). If the angular acceleration $D\omega n$ is greater than or equal to the misfire discrimination level $TH_{MF}$, the warning lamp 60 is turned off, in Step S115 corresponding to Step S14 in FIG. 4. On the other hand, if it is judged in Step S114 that the angular acceleration $D\omega n$ is smaller than the misfire discrimination level $TH_{MF}$, and thus there is a high probability that a misfire has occurred, the processor 11 provisionally stores data indicating that a misfire has occurred in the cylinder identified in Step S101 (Step S116).

Subsequently, in order to determine whether the misfire detected in Step S114 is due to rough-road travel of the motor vehicle, judgement of rough-road travel is started. To this end, the processor 11 restarts a sixth timer for measuring a time $TIM_6$ elapsed from the start of the judgement of rough-road travel (Step S117), then sets the flag $F_{RR}$ to "1" which value indicates that the judgement of rough-road travel is under execution (Step S118), and ends the present cycle of the process.

In the misfire detection cycle immediately after the start of the judgement of rough-road travel, the processor 11 judges that the value of the flag $F_{RR}$ is "1", in Step S113 following the aforementioned series of Steps S101 to S110. In this case, the processor 11 compares the time $TIM_6$ elapsed from the start of the judgement of rough-road travel with a seventh set value, which represents a time period required after the judgement of rough-road travel is started until the same judgement is completed (Step S119). If it is judged in Step S119 that the elapsed time $TIM_6$ is shorter than the seventh set value, and thus the rough-road travel judgment time has not yet elapsed, the processor 11 compares the average angular acceleration $D\omega n$, calculated in Step S110, with a rough-road discrimination level $TH_{RR}$ (>0) (Step S120). Then, if the calculated angular acceleration $D\omega n$ is greater than the rough-road discrimination level $TH_{RR}$, the processor 11 judges that the motor vehicle is running on a rough road.

When it is, judged in Step S120 that the motor vehicle is traveling on a rough road, the processor 11 resets the flag $F_{RR}$ to "0" which value indicates that the judgement of rough-road travel is not under execution (Step S121), restarts the fourth timer for measuring the time $TIM_4$ elapsed from the detection of an occurrence of rough-road travel (Step S122), and erases the provisionally stored cylinder misfire data (Step S123), on the assumption that the misfire detected provisionally in Step S116 of the preceding detection cycle was due to rough-road travel. Thereupon, the present cycle of the misfire detection process is ended.

In this embodiment, if, during the judgement of rough-road travel, the angular acceleration $D\omega n$ is smaller than or equal to the rough-road discrimination level $TH_{RR}$ and thus it is judged that the vehicle is not running on a rough road, the present cycle of the misfire detection process is immediately ended. According to this detecting method, even if a misfire occurs during the judgement of rough-road travel, such misfire is ignored. Therefore, a separate determination may be made as to the occurrence of a misfire after it is judged in Step S120 that the vehicle is not running on a rough road.

If it is judged in Step S119 that the time $TIM_6$ elapsed from the start of the judgement of rough-road travel is longer than or equal to the seventh set value while the aforementioned judgement of rough-road travel is repeated, that is, when the rough-road travel judgement time has passed, the processor 11 resets the flag $F_{RR}$ to "0" which value indicates that the judgement of rough-road travel is not under execution (Step S124). Then, in Steps S125 and S126 corresponding, respectively, to Steps S12 and S13 in FIG. 4, the warning lamp 60 is lighted, and the cylinder misfire data is stored as conclusive data, on the assumption that the misfire data stored provisionally In Step S116 of the preceding detection cycle was not attributable to rough-road travel. The processor 11 then restarts the fifth timer for measuring the time $TIM_5$ elapsed after the detection of an occurrence of misfire (Step S127), and ends the present cycle of the misfire detection process.

According to the procedure shown in FIGS. 8 and 9, decelerating condition, shift operation, rough-road travel, etc. can be advantageously discriminated, without requiring special hardware.

A misfire detecting method according to a second embodiment of the present invention will be now described.

The misfire detecting method of the second embodiment is characterized mainly in that the judgement of rough-road travel is carried out according to a procedure different from that shown in FIGS. 8 and 9, based on the output from the throttle position sensor (indicated at 70 in FIG. 1). The method of this embodiment can be executed with the detection system shown in FIGS. 1 and 2, and accordingly, description of the system is omitted.

Figure 11:
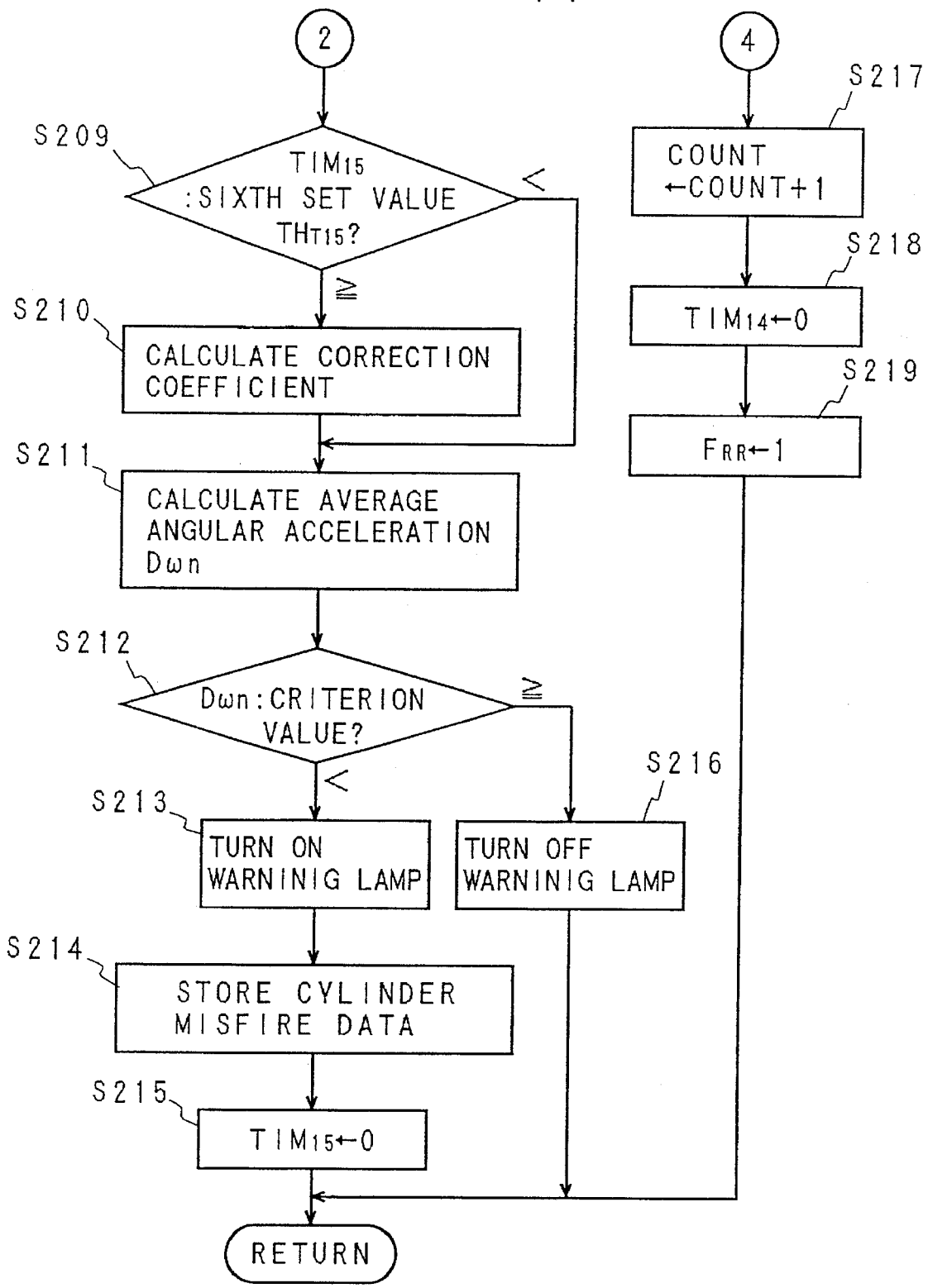
FIG. 11 is a flowchart showing another part of the misfire detection process, following the part shown in FIG. 10.
Figure 12:
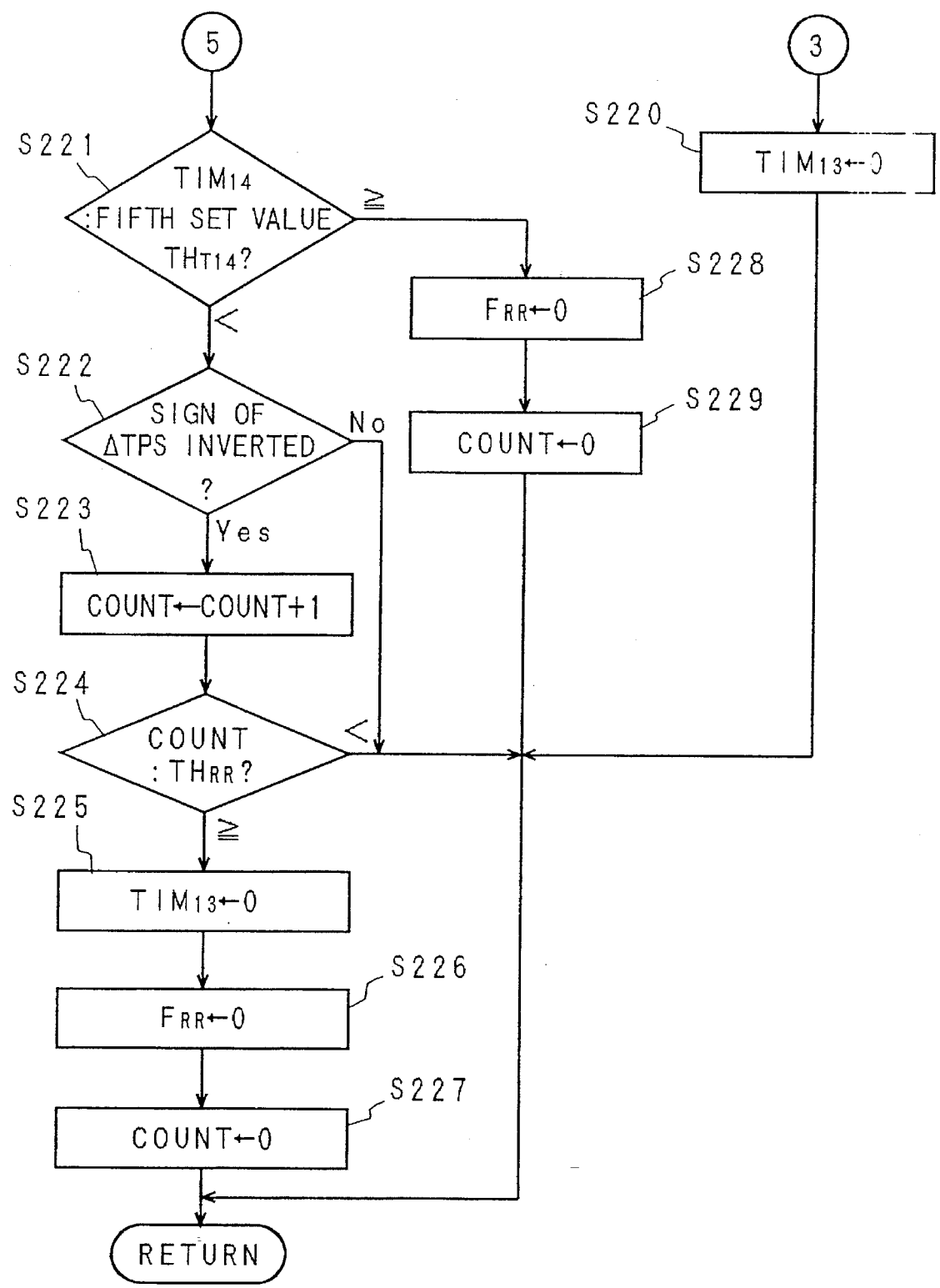
FIG. 12 is a flowchart showing the remaining part of the misfire detection process shown in FIGS. 10 and 11.

Referring to FIGS. 11 through 12, in each cycle of a misfire detection process according to the method of the second embodiment, the processor 10 successively executes Steps S201 to S204 corresponding, respectively, to Steps S101 to S104 in FIG. 8. If it is judged in Step S203 that an elapsed time $TIM_{11}$, obtained by a first timer for measuring the time $TIM_{11}$ elapsed from the engine start, is shorter than a first set value, or if it is judged in Step S204 that an elapsed time $TIM_{12}$, obtained by a second timer for measuring the time $TIM_{12}$ elapsed from the turning-off operation of the ignition key, is shorter than a second set value, the processor 11 immediately ends the present cycle of the misfire detection process, thereby preventing erroneous detection from occurring, e.g., at the engine start or when the ignition key is off.

If it is judged in Steps S203 and S204 that the elapsed times $TIM_{11}$ and $TIM_{12}$ are greater than or equal to the respective set values, and thus the current engine state is not immediately after the start and at the same time the ignition key has not just been turned off, the processor 11 reads the output TPS of the throttle position sensor 70, also reads a throttle position sensor output TPS read in the preceding cycle and stored in the memory 13, and calculates a sensor output change rate a $\Delta TPS$ representing a change in the throttle position from the preceding cycle to the present cycle, i.e., the rate of change in the throttle position. Subsequently, to determine whether the engine is decelerating, the processor 11 compares the sensor output change rate $\Delta TPS$ with a third set value $TH_{TP}$ ($TH_{TP}<0$) (Step S205). The start of decelerating condition may be detected based on the rate of change of actual load level detected by other engine load sensors such as the airflow sensor or the suction pressure sensor, instead of the throttle sensor output (change rate a $\Delta TPS$).

If it is judged in Step S205 that the output change rate $\Delta TPS$ of the throttle position sensor is smaller than the set value $TH_{TP}$, and thus the engine operation is in a transition to decelerating condition, the processor 11 restarts a third timer for measuring a time $TIM_{13}$ elapsed from the start of engine deceleration or from the detection of rough-road travel (Step S220 in FIG. 12), and ends the present cycle of the misfire detection process.

On the other hand, if it is judged in Step S205 that the sensor output change rate a $\Delta TPS$ is greater than or equal to the set value $TH_{TP}$, and thus the engine is not decelerating, the processor 11 compares the time $TIM_{13}$ elapsed from the moment when a decelerated operation of the engine was started or when the vehicle making rough-road travel was detected, which time is obtained by referring to the third timer, with a fourth set value $TH_{T13}$ representing a misfire detection prohibit time (Step S206). If the elapsed time $TIM_{13}$ is shorter than the value $TH_{T13}$ and thus the misfire detection prohibit time has not yet passed, the processor 11 immediately ends the present cycle of the misfire detection process; on the other hand, if the misfire detection prohibit time has already elapsed, the processor 11 compares the value of the rough-road judgment flag $F_{RR}$ with the value "0" (Step S207).

If the value of the flag $F_{RR}$ is "0" which value indicates that the judgement of rough-road travel is not under execution, the processor 11 reads the throttle position sensor outputs TPS read in the preceding and present cycles, respectively, and stored in the memory 13, and calculates the change rate $\Delta TPS$ of the sensor output from the preceding cycle to the present cycle. Subsequently, to determine whether the judgement of rough-road travel should be initiated, the processor 11 determines whether the sign of the sensor output change rate $\Delta TPS$ has been inverted, i.e., whether the value $\Delta TPS$ has changed from positive to negative or from negative to positive (Step S208). Preferably, in order to provide a hysteresis characteristic in this judgement, the processor 11 judges that the sign of the sensor output change rate ΔTPS has been inverted, when the sign of the value ΔTPS changes from plus to minus or vice versa and when a changed amount of the value ΔTPS is larger than a predetermined threshold.

If it is judged in Step S208 that the sign of the sensor output change rate ΔTPS has not been inverted, the processor 11 compares a time $TIM_{15}$ elapsed from the detection of an occurrence of misfire, measured by a fifth timer which is restarted when the occurrence of a misfire is detected, as mentioned later, with a sixth set value $TH_{T15}$ representing a time period for which the calculation of the correction coefficient is prohibited after the detection of misfire, to thereby determine whether the correction coefficient need be calculated (Step S209 (corresponding to Step S108 in FIG. 8)). Then, If it is judged in Step S209 that the elapsed time $TIM_{15}$, is longer than or equal to the set value $TH_{T15}$, and thus the correction coefficient calculation prohibit time has already elapsed, the processor 11 successively executes a correction coefficient calculation Step S210, an average angular acceleration calculation Step S211, and a misfire detection Step S212 corresponding, respectively, to Steps S9 to S11 in FIG. 4. On the other hand, if it is judged in Step S209 that the elapsed time $TIM_{15}$ is shorter than the set value $TH_{T15}$, and thus the correction coefficient calculation prohibit time has not yet passed, the processor 11 immediately executes the angular acceleration calculation Step S211, without calculating the correction coefficient in Step S210.

Then, if it is judged in Step S212 that the angular acceleration Dωn calculated in the present cycle is smaller than the criterion value, that is, if it is judged that a misfire has occurred in the cylinder identified In Step S201, the processor 11 lights the warning lamp 60 (Step S213), stores data representing the misfired cylinder (Step S214), restarts the fifth timer for measuring the time $TIM_{15}$ elapsed after the detection of misfire (Step S215), and ends the present cycle of the misfire detection process. On the other hand, if it is judged in Step S212 that no misfire is occurring in the identified cylinder, the warning lamp 60 is turned off (Step S216), and the present cycle of the process is ended.

If, in Step S208, It is judged that the sign of the output change rate ΔTPS of the throttle position sensor has been inverted, the processor 11 adds "1" to the value COUNT of a rough-road judgment counter (not shown) (Step S217), restarts a fourth timer (not shown) for measuring a time $TIM_{14}$ elapsed from the start of the judgement of rough-road travel (Step S218), and sets the flag $F_{RR}$ to "1" which value indicates that the judgement of rough-road travel is under execution (Step S219), to thereby start the judgement of rough-road travel, followed by termination of the present cycle of the process.

In the detection cycle started immediately after the flag $F_{RR}$ is set to "1", the processor 11 judges in Step S207 that the value of the flag $F_{RR}$ is not "0", and accordingly, compares the time $TIM_{14}$ elapsed from the start of the judgment of rough-road travel with a fifth set value $TH_{T14}$ representing a rough-road judgement time (Step S221). If it is judged in Step S221 that the elapsed time $TIM_{14}$ is shorter than the set value $TH_{T14}$, and thus the rough-road judgment time has not yet passed, the processor 11 determines whether the sign of the output change rate ΔTPS of the throttle position sensor has been inverted (Step S222). If the sign of the value ΔTPS has not been inverted, the present cycle of the process is ended; on the other hand, if the sign of the value ΔTPS has been inverted, "1" is added to the value COUNT of the rough-road judgment counter (Step S223), and the updated count value COUNT is compared with a seventh set value $TH_{RR}$ corresponding to a number of inversions of the sign of the sensor output change rate ΔTPS, which number indicates rough-road running condition of the motor vehicle (Step S224).

If it is judged in Step S224 that the count value COUNT is smaller than the set value $TH_{RR}$, and thus it cannot be concluded that the motor vehicle is running on a rough road, the processor 11 ends the present cycle of the process. On the other hand, if it is judged in Step S224 that the count value COUNT is greater than or equal to the set value $TH_{RR}$, the processor 11 judges that the accelerator pedal has been alternately depressed and released a predetermined number of times or more, and accordingly, that the motor vehicle is traveling on a rough road. When rough-road travel is detected in this manner, the processor 11 restarts the third timer for measuring the time $TIM_{13}$ elapsed from the detection of rough-road travel (Step S225), resets the flag $F_{RR}$ to "0" which value indicates that the judgment of rough-road travel is not under execution (Step S226), and resets the value COUNT of the rough-road judgment counter to "0" (Step S227).

If, in Step S221, it is judged that the time $TIM_{14}$ elapsed from the start of the judgement of rough-road travel is longer than or equal to the set value $TH_{T14}$, and thus the rough-road judgment time has already passed, the processor 11 judges that it is no longer necessary to continue to make the judgement as to whether the motor vehicle is traveling on a rough road. In this case, the processor 11 resets the flag $F_{RR}$ to "0" which value indicates that the judgement of rough-road travel is not under execution (Step S228), resets the value COUNT of the rough-road judgment counter to "0" (Step S229), and ends the present cycle of the process.

The present invention is not limited to the first and second embodiments described above, and various modifications are possible.

For example, although in the foregoing embodiments is described a case wherein the present invention is applied to a 6-cylinder engine, the invention can be applied to various types of engines such as a 4-cylinder engine.

Further, in the above embodiments, continuance or start of decelerating condition of the engine is detected based on the volumetric efficiency $η_v$ or the output change rate ΔTPS of the throttle position sensor; it is judged that shift operation of the transmission is in progress before a predetermined time elapses after the departure from the decelerating condition; and it is judged that the motor vehicle is running on a rough road when the angular acceleration becomes greater than the rough-road discrimination level after an occurrence of a misfire has been detected once, or when the sign of the sensor output change rate a ΔTPS has been inverted (when the accelerator pedal has been depressed and released) a predetermined number of times or more. However, decelerating condition, shift operation, and rough-road travel can be detected by various methods. For example, decelerating condition can be detected based on the throttle valve opening, intake air quantity or the like, and rough-road travel can be detected based on the speeds of the front and rear wheels, acceleration of the vehicle body, or the like. Particularly, in the second embodiment, the start of decelerating condition is detected based on the output change rate ΔTPS of the throttle position sensor, and after decelerating condition is detected, the misfire detection is prohibited for the set time (that is, until the elapsed time $TIM_{13}$ measured by the third timer exceeds the set value), on the assumption that there is a high probability of decelerating condition being continued (or a high probability of erroneous misfire detection being caused due to engine deceleration or the influence of shift operation). Alternatively, in order to detect the start of decelerating condition, a decrease in the change rate $\Delta\eta_v$ of the volumetric efficiency $\eta_v$, obtained based on the airflow sensor output etc., below a set value, or a decrease in the suction pressure $P_B$, obtained based on the boost sensor output etc., below a set value may be detected, instead of or in addition to the output change rate a $\Delta$TPS of the throttle position sensor.

Furthermore, in the misfire detection process (FIGS. 4 and 8) of the above embodiments, the correction coefficient is calculated to eliminate the period measurement error attributable to variation in the angular distance between the vanes, and the angular acceleration of the crankshaft is calculated using the correction coefficient, but the calculation of the correction coefficient and the calculation of the angular acceleration based on the correction coefficient are not essential.

We claim:

1. A misfire detecting method in which misfire detection is carried out based on a variation in rotating condition of an output shaft of an internal combustion engine, comprising:
   (a) determining a variation of rotation of said output shaft by determining whether a rotation of said output shaft has varied toward a higher-speed side immediately after said rotation of said output shaft has varied toward a lower-speed side;
   (b) provisionally determining that a misfire is occurring when said detected variation of rotation below said predetermined misfire discrimination value;
   (c) initiating a timer to count a predetermined rough-road judgement after said misfire has been provisonally determined;
   (d) determining that said vehicle is running on a rough road when said variation in rotation becomes greater than a predetermined rough-road discrimination value before said predetermined rough-road judgment time elapses; and
   (e) invalidating said provisionally determined misfire when it is detected in said step (d) that said vehicle is running on said rough road.

2. A misfire detecting method in which misfire detection is carried out based on a rotating condition of an output shaft of an internal combustion engine, comprising:
   (a) detecting an opening degree of a throttle valve of said internal combustion engine;
   (b) determining that a vehicle is running on a rough road when it is detected in said step (a) that said opening degree of said throttle valve continually changes in opening and closing directions, indicative of a vehicle body vibration caused by running of said vehicle on a rough road; and
   (c) prohibiting said misfire detection when it is detected in said step (b) that said vehicle is running on said rough road.

3. The misfire detecting method according to claim 2, further comprising:
   prohibiting said misfire detection when a transmission coupled to said internal combustion engine is performing a gear changing operation.

4. The misfire detection method according to claim 2, further comprising:
   calculating a correction coefficient for compensating for a structural error of a sensor which is operable to detect said rotating condition of said internal combustion engine; and correcting said rotating condition by said correction coefficient.

5. The misfire detection method according to claim 2, further comprising:
   prohibiting said misfire detection when said internal combustion engine is deceleratingly operated.

6. The misfire detection method according to claim 2, further comprising:
   prohibiting said misfire detection when a transmission coupled to said internal combustion engine is performing a gear changing operation.

7. The misfire detecting method according to claim 2, wherein said step (b) includes the substep of
   determining that said motor vehicle is running on said rough road when a changeover between opening-increasing motion and opening-decreasing motion of said 3throttle valve take place a predetermined number of times.

8. A misfire detecting method in which misfire detection is carried out based on a rotating condition of an output shaft of an internal combustion engine, and the misfire detection is prohibited when it is determined that the internal combustion engine is operating in a particular operating condition in which load on the internal combustion engine can suddenly change, comprising:
   determining that said internal combustion engine is operating in said particular operating condition, during a predetermined period after an ignition of said internal combustion engine is turned off.

9. The misfire detecting method according to claim 8, further comprising:
   calculating a correction coefficient for compensating for a structural error of a sensor which is operable to detect said rotating condition of said internal combustion engine; and
   correcting said rotating condition by said correction coefficient.

10. The misfire detection method according to claim 9, wherein said calculating step includes the substep of
    suspending calculation of said correction coefficient when it is determined that said internal combustion engine is operating in said particular operating condition.

11. A misfire detecting method in which misfire detection is carried out based on a rotating condition of an output shaft of an internal combustion engine, comprising:
    (a) detecting a rotational speed of said internal combustion engine;
    detecting a intake air amount;
    determining an intake air amount per suction stroke at said detected rotational speed based on said detected rotational speed and said detected intake air amount;
    (d) calculating a volumetric efficiency based on said determined intake air amount per suction stroke and a maximum intake air amount which can be sucked per suction stroke at said detected rotational speed; and
    (e) prohibiting said misfire detection when said calculated volumetric efficiency is smaller than a predetermined discrimination value.

12. The misfire detection method according to claim 11, wherein said predetermined discrimination value is set at minimum volumetric efficiency to obtain a stable combustion.

13. The misfire detecting method according to claim 25, wherein said step (f) includes the substep of
    prohibiting said misfire detection for a set time period from a moment when said volumetric efficiency rises above said predetermined discrimination value.

14. The misfire detection method according to claim 11, wherein said volumetric efficiency is calculated by dividing said determined intake air amount per suction stroke by said maximum intake air amount.

15. The misfire detecting method according to claim 11, further comprising:

calculating a correction coefficient for compensating for a structural error of a sensor which is operable to detect the rotating condition of said internal combustion; and correcting said rotating condition by said correction coefficient.

16. The misfire detecting method according to claim 15, wherein said calculating step includes the substep of suspending the calculation of said correction coefficient when it is determined that said internal combustion engine is operating in a particular operating condition in which load on said internal combustion engine can suddenly change.

* * * * *

UNITED STATES PATENT AND TRADEMARK OFFICE
CERTIFICATE OF CORRECTION

PATENT NO. : 5,587,909
DATED : DECEMBER 24, 1996
INVENTOR(S) : T. MATSUMOTO et al.

It is certified that error appears in the above-indentified patent and that said Letters Patent is hereby corrected as shown below:

In claim 11, line 6, change "detecting a intake air amount" to --(b) detecting an intake air amount--;

In claim 11, line 7, before "determining" insert --(c)--;

In claim 13, line 1, change "25" to --11--; and

In claim 13, line 2, change "(f)" to --(e)--.

Signed and Sealed this

Fourteenth Day of October, 1997

*Attest:*

BRUCE LEHMAN

*Attesting Officer*  Commissioner of Patents and Trademarks